United States Patent [19]

Mount et al.

[11] 4,090,822

[45] May 23, 1978

[54] MULTI-SECTIONAL DRIVESHAFT FOR A ROTARY PISTON MECHANISM

[75] Inventors: Robert E. Mount, Mendham; Michael T. Gavrun, Bayonne, both of N.J.

[73] Assignee: Curtiss-Wright Corporation, Wood-Ridge, N.J.

[21] Appl. No.: 763,348

[22] Filed: Jan. 28, 1977

[51] Int. Cl.² .................. F01C 21/00; F01C 1/02; F16B 2/00; B16C 3/12
[52] U.S. Cl. ...................... 418/60; 74/597; 403/15; 403/16; 403/19; 403/334; 418/270
[58] Field of Search .................. 418/60, 200, 210–214; 123/8.07; 403/16, 37, 334, 377, 15, 19; 285/39; 74/597, 598; 29/525

[56] References Cited

U.S. PATENT DOCUMENTS

| 302,003 | 7/1884 | Knorp | 403/334 |
|---|---|---|---|
| 1,953,297 | 4/1934 | Good | 403/16 |
| 2,010,057 | 8/1935 | Buckwalter | 403/15 |
| 2,764,437 | 9/1956 | Bratt | 403/16 |
| 3,077,867 | 2/1963 | Froede | 418/210 |
| 3,352,290 | 11/1967 | Kuroda | 418/60 |
| 3,620,656 | 11/1971 | Sharples | 418/60 |
| 3,924,978 | 12/1975 | Loyd, Jr. et al. | 418/60 |
| 3,947,948 | 4/1976 | Fredriksson et al. | 403/15 |

FOREIGN PATENT DOCUMENTS

| 2,058,412 | 6/1972 | Germany | 418/60 |
|---|---|---|---|
| 1,451,720 | 8/1969 | Germany | 418/60 |
| 957,240 | 5/1964 | United Kingdom | 403/15 |

*Primary Examiner*—John J. Vrablik
*Attorney, Agent, or Firm*—Arthur Frederick

[57] ABSTRACT

The multi-sectional driveshaft for a multi-unit rotary piston mechanism has a plurality of driveshaft sections of identical configuration, arrangted co-axially with the end portion of one section telescopically engaging the end portion of a next adjacent section. Each section comprises an elongated body having an axial bore therethrough and an eccentric portion between the opposite end portions of the elongated body. One end portion is of reduced size with a shoulder extending normal to the axial bore. The other end portion of each section has a portion of the axial bore adjacent thereto of a size and configuration complementary to the one end portion for receiving and engaging the one end portion of the next adjacent section. A tie-bolt extends co-axially through the bores of the sections for securing the sections in end-to-end engagement with each other for torque transmission and with the other end portion of a section in abutment against the shoulder of said one end portion of the next adjacent driveshaft section. The bore of each section may be provided with an internally threaded portion adapted to receive various tool means for assembly and disassembly of the driveshaft sections.

6 Claims, 10 Drawing Figures

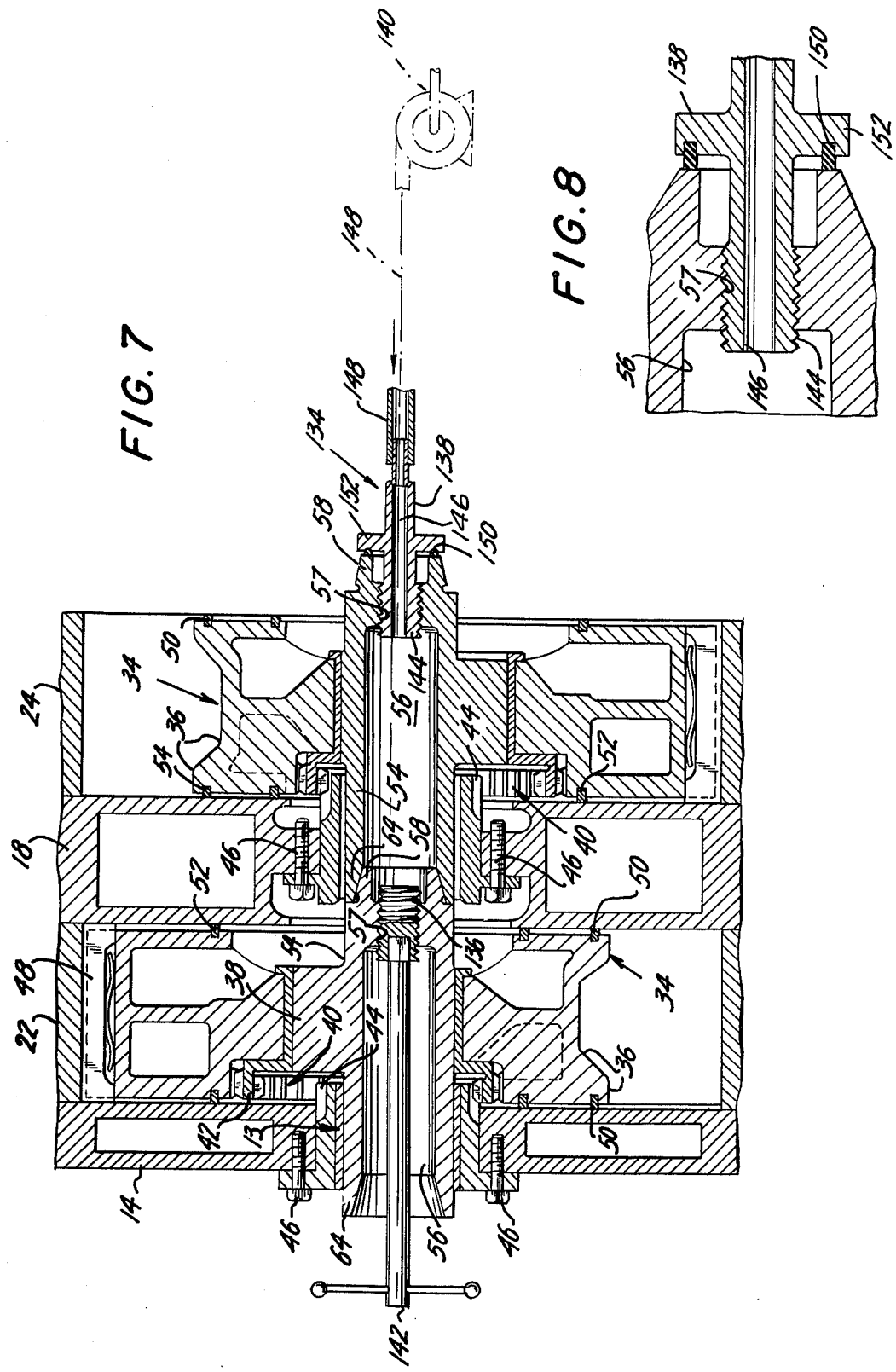

MULTI-SECTIONAL DRIVESHAFT FOR A ROTARY PISTON MECHANISM

This invention relates to a multi-unit rotary mechanism of the type disclosed in the patent to Bentele, U.S. Pat. No. 3,062,455 dated Nov. 6, 1962 and, more specifically, to a multi-sectional driveshaft for such rotary mechanism.

BACKGROUND OF THE INVENTION

In multi-unit rotary mechanisms of the type disclosed in the aforesaid Bentele Patent, particularly of three or more units, wherein each unit consists of a housing cavity in which a rotor is supported on a mainshaft or driveshaft for planetary rotation within its associated housing cavity, there are the problems of achieving relative ease and rapidity of assembly and disassembly of the mechanism. One solution to the problem has been to employ a sectional driveshaft, as exemplified in the following U.S. Patents:
Herr — U.S. Pat. No. 1,858,014 — 5/10/32 Butterfield — 2,595,761 — 5/ 6/32 Froede — U.S. Pat. No. 3,077,867 — 2/19/63 Jones — U.S. Pat. No. 3,240,423 — 3/15/66 Takebayashi — U.S. Pat. No. 3,279,279 — 10/18/66 Kuroda — U.S. Pat. No. 3,352,290 — 11/14/67 Sharples — U.S. Pat. No. 3,620,656 — 11/16/71 Loyd, Jr. et al — U.S. Pat. No. 3,924,978 — 12/ 9/75

In such sectional driveshafts, each section must be properly located axially to position the eccentric portion in its associated housing cavity and coupled together in torque transmitting relationship. In the driveshaft disclosed in the patent to Froede, U.S. Pat. No. 3,077,867, the sections are coupled together by a threaded insert which draws together the two adjacent telescopically and complementary tapered end portions of the sections. To provide in the Froede driveshaft, both the proper frictional engagement for torque transmission and location of the eccentric, is difficult since there is no positive locating means for axially locating the sections. In the Loyd, et al apparatus, disclosed in U.S. Pat. No. 3,924,978, the sections and hence their eccentric portions, are located by annular abutment of the telescopically arranged end portions of adjacent sections. However, this structure is relatively complex since it has a threaded insert similar to the Froede structure, and in addition, a tapered plug coacting with the threaded insert to secure the adjacent driveshaft sections together. The Sharples U.S. Pat. No. 3,620,656 does not show the endmost driveshaft sections and, therefore, it fails to show how, if all the sections are identical, power is transmitted therefrom. It must be assumed, therefore, that conventional means requiring a specially constructed endmost section is employed such as providing a splined interconnection between the endmost driveshaft section and the power takeoff shaft.

Also, in the prior art structures, it is difficult to break the frictional interference grip between the telescoping, abutting surfaces so that disassembly has proven laborious and time-consuming.

Furthermore, the prior known multi-sectional driveshafts do not provide interchangeable sections so that manufacture, assembly and disassembly are more costly and difficult.

It is, therefore, an object of this invention to provide a multi-sectional driveshaft for a rotary piston mechanism which is relatively simple in construction and is capable of being quickly and easily assembled and disassembled.

Another object of this invention is to provide a multi-sectional driveshaft for a rotary piston mechanism which is capable of having its constituent sections connected together in torque transmitting interference fit and yet capable of being easily and quickly disconnected.

A still further object of the present invention is to provide a multi-sectional driveshaft for a rotary piston mechanism in which each section is of the same configuration and interchangeable with each other.

SUMMARY OF THE INVENTION

Accordingly, the present invention contemplates an improved, built-up or multi-sectional driveshaft for a multi-unit rotary piston mechanism of the Wankel-type wherein each unit consists of a piston and a housing forming a cavity in which the piston is supported for planetary movement.

The multi-sectional driveshaft, according to this invention, comprises a plurality of driveshaft sections, one section being provided for each unit. Each of the driveshaft sections comprises an elongated body having an axial bore therethrough and an eccentric portion between the opposite end portions thereof for supporting a piston associated therewith. One end portion of the section is of reduced size. The other end portion has a portion of the axial bore adjacent thereto of a size and configuration complementary to the aforesaid one end portion. The driveshaft sections are disposed in axial alignment with the eccentric portion of each section located in its associated housing cavity and with the aforesaid one end portion telescopically receivable in the other end portion of the next adjacent driveshaft section. A holding means is provided for securing the driveshaft sections in end-to-end engagement with each other so that the other end portion of a section is abutting the shoulder of the one end portion of the next adjacent section.

In a narrower aspect of this invention, the bore of each driveshaft section has an internally threaded portion which serves to receive a tool means for effecting both assembly and disassembly of the multi-section driveshaft.

In a first embodiment, an elongated bar having at least one threaded end portion is turned into the internally threaded portion of one adjacent driveshaft section so as to extend co-axially of the bore of the other next adjacent section. A thrust means coacts with the distal end of the bar and the next adjacent driveshaft section to exert forces on the sections drawing them into engagement.

In a second embodiment, an elongated bar having a threaded end portion is turned into the internally threaded portion of one adjacent driveshaft section so as to extend co-axially of the bore of the other next adjacent section and to a point near the internally threaded portion of the other next adjacent section. A thrust member having a threaded portion is turned into the internally threaded portion of the other next adjacent section and to engagement with the bar to exert an axial force on the bar so that an oppositely directed reaction force on the next adjacent section effects separation of the next adjacent driveshaft sections.

In a third embodiment, a plug means coacts with the internally threaded portion of one adjacent driveshaft section to seal the bore while coupling means coacts with the internally threaded portion of the other next adjacent section to form a closed chamber and to communicate the chamber thus formed in the bore with a source of pressurized fluid and thereby effect separation of the next adjacent driveshaft sections.

In a fourth embodiment, a recess means is located in either the one end portion or the other end portion of the driveshaft sections so that when such end portions of adjacent sections are in telescopic engagement, a chamber is defined therebetween. A fluid passageway communicates that chamber with the bore and has means for connection with a pressurized fluid supply means so that upon connection with a source of pressurized fluid, such fluid is conducted to the chamber to separate the engaged adjacent driveshaft sections.

BRIEF DESCRIPTION OF DRAWINGS

The invention will be more fully understood from the following detailed description thereof when considered in connection with the accompanying drawing wherein several embodiments of the invention are illustrated by way of example and in which:

FIG. 7 is a view similar to FIG. 5 showing the means, according to a third embodiment, employable for disassembly of the driveshaft sections;

FIG. 8 is an enlarged, fragmentary cross-sectional view of the coupling means which forms part of the means shown in FIG. 7;

DESCRIPTION OF PREFERRED EMBODIMENTS

Figure 1:
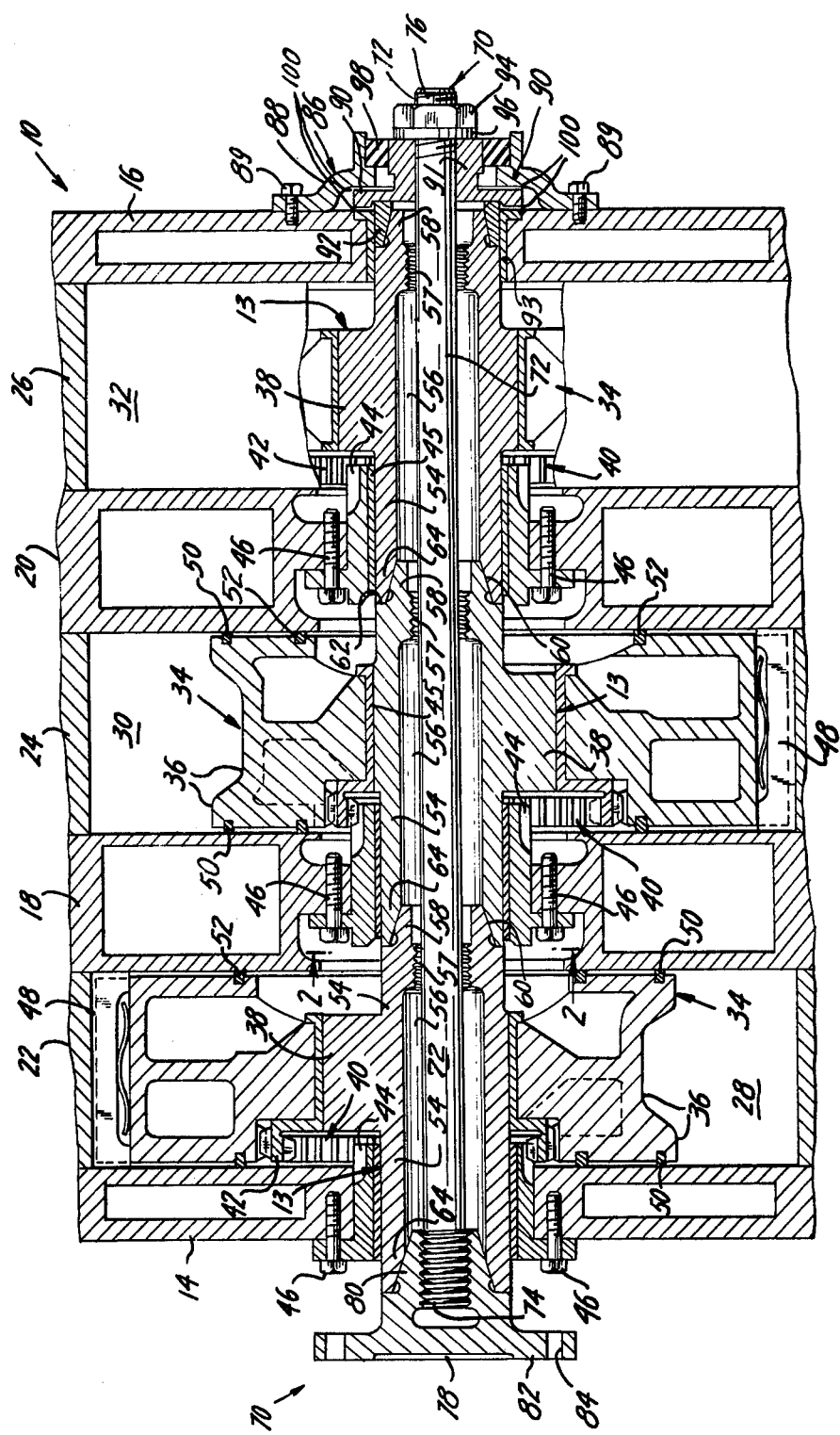
FIG. 1 is a cross-sectional view of a multi-unit rotary piston mechanism of the Wankel-type having a multi-sectional driveshaft, according to this invention.
Figure 2:
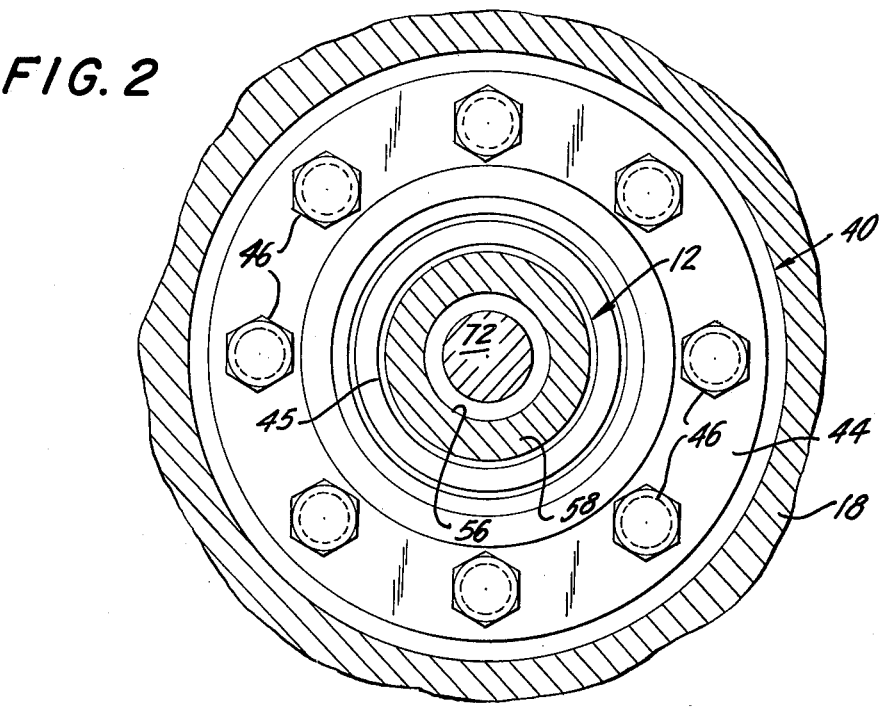
FIG. 2 is a view in cross-section taken along line 2—2 of FIG. 1 on a somewhat enlarged scale.
Figure 3:
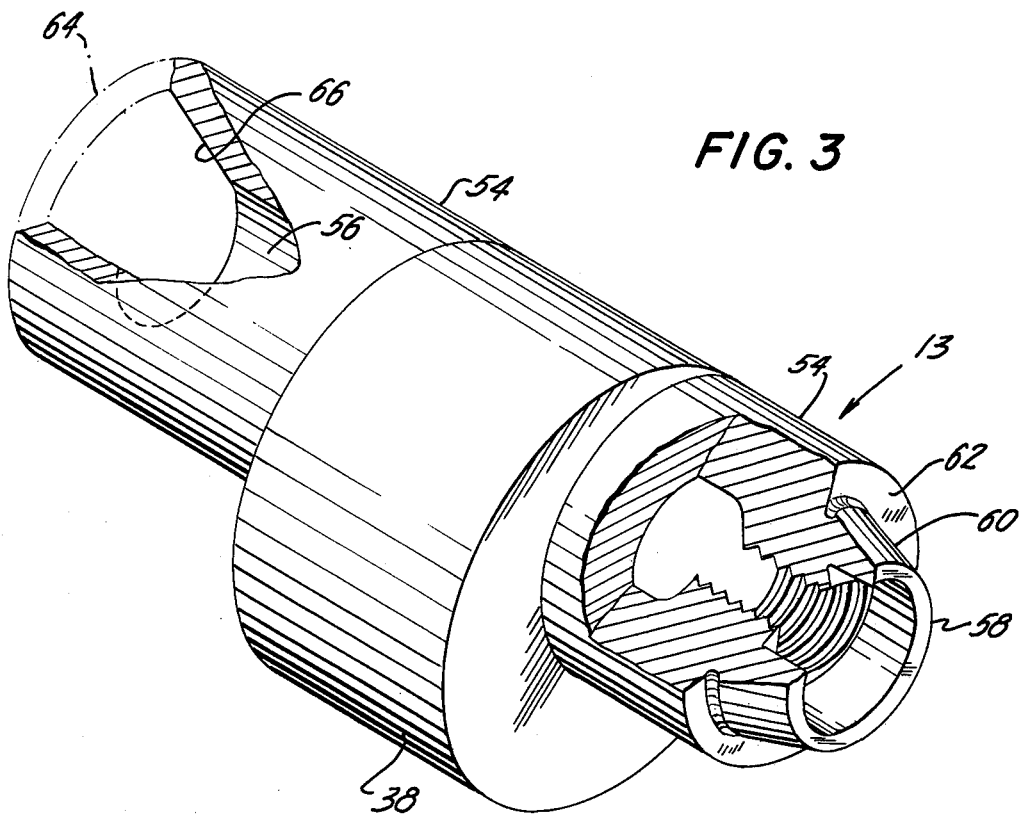
FIG. 3 is a perspective view of one of the driveshaft sections shown in FIG. 1 and illustrated on an enlarged scale.

Now referring to the drawings and, more particularly, FIGS. 1 to 3, the reference number 10 generally designates a multi-unit, rotary piston mechanism of the Wankel type, such as disclosed in the patent to Bentele, U.S. Pat. No. 3,062,435 dated Nov. 6, 1962, which has, in accordance with this invention, a multi-sectional driveshaft 12 consisting of a plurality of sections 13 arranged in end-to-end, co-axial relationship. The mechanism 10 may be an internal combustion engine, expansion engine, compressor or pump and may be of three units, as shown, or of two or more than three units, without departing from the scope and spirit of this invention.

As best shown in FIG. 1, mechanism 10 comprises a housing consisting of two end walls 14 and 16, two intermediate walls 18 and 20 and three peripheral walls 22, 24 and 26. The end walls 14 and 16 and intermediate walls 18 and 20 are held in spaced parallel relationship to each other by peripheral walls 22, 24 and 26 to define therebetween three cavities 28, 30 and 32. The walls are held in fixed relationship by suitable means such as tie-bolts or through-bolts (not shown) but disclosed in the previously mentioned U.S. patents to Bentele and Jones. Each of the peripheral walls 22, 24 and 26 has an inner peripheral surface of trochoidal configuration to form a multi-lobe cavity.

Disposed within each of the cavities 28, 30 and 32 is a rotary piston 34 which has a multi-sided profile so that, in a two-lobe cavity, the rotary piston has three flank surfaces 36 to form a generally triangular profile. Each of the rotary pistons 34 is supported for planetary movement within their respective cavities 28, 30 and 32 by an eccentric portion 38 of a driveshaft section 13. To maintain the desired angular relationship of an eccentric portion 38 and its associated rotary piston 34, a timing gear assembly 40 is provided. Each of the assemblies 40 comprises an internal ring gear 42 fixed to the associated rotary piston and a pinion gear 44 fixed to end wall 14 or intermediate walls 18 and 20 by bolts 46 so as to mesh with ring gear 42 (see FIG. 2). Each rotary piston 34 defines with its associated cavity a plurality of working chambers which successively expand and contract in volumetric size as the rotary piston planetates within its cavity. To isolate each of the working chambers from each other and the surrounding areas, each rotary piston carries a seal grid system which may include, as shown, apex seal assemblies 48, gas seal strips 50 and oil seal rings 52.

MULTI-SECTIONAL DRIVESHAFT

The multi-sectional driveshaft 12, as previously stated, is made up of a plurality of sections 13, one for each rotary piston 34. Each driveshaft section, as best shown in FIG. 3, comprises an elongated, cylindrical body 54 which may, as shown, have an integrally formed eccentric portion 38 or one which is otherwise fixedly connected to body 54. As is conventional, the longitudinal axis of body 54 is offset from the axis of eccentric portion 38. The body 54 is provided with an axial bore 56 extending therethrough. One end portion 58 has a frusto-conical configuration with its tapered annular surface 60 terminating at an annular, radially extending shoulder 62. Adjacent to end portion 58, bore 56 is provided with reduced diameter, threaded portion 57 which functions to receive various tool means shown in FIGS. 4, 5 and 7 which may be used to effect assembly and disassembly of the driveshaft sections. The end portion 64 opposite from end portion 58 of each driveshaft section has, at the adjacent portion of bore 56, a tapered, inner, annular surface 66 which has a taper complementary to surface 60. The dimensions of surfaces 60 and 66 are such that end portion 58 of one section 13 is telescopically and forceably receivable within end portion 64 of a next adjacent section 13 with an interference fit of sufficient magnitude to provide at least part of the torque transmitting capacity of the connection. When end portion 64 of one driveshaft section 13 is fully telescoped over the end portion 58 of the next adjacent driveshaft section 13, the end portion 64 abuts shoulder 62 to thus limit the amount of telescopic movement, thereby avoiding possible deformation of end portion 64, and also properly position the driveshaft sections axially relative to their respective housing cavities 28, 30 and 32. The frictional engagement between the abutting surfaces of end portion 64 and shoulder 62 provides the remaining portion of the torque transmitting capacity of the connection. In other words, the torque transmitting capacity which is necessary for torque transmission is divided between the frictional engagement of tapered surfaces 60 and 66 and the frictional engagement of end portion 64 and shoulder 62.

DRIVESHAFT TIE-BOLT ASSEMBLY

As shown in FIG. 1 the plurality of driveshaft sections 13 are held in torque transmitting engagement by a tie-bolt assembly 70. The tie-bolt assembly 70 comprises an elongated bar 72 which is threaded at opposite ends 74 and 76 and extends co-axially through the aligned bores 56 of the driveshaft sections 13. The threaded end portion 74 of bar 68 is turned into a threaded bore of a coupling 78. The coupling 78 has a hub portion 80 which has a tapered peripheral surface complementary to tapered, inner, annular surface 66 of driveshaft sections 13 and is sized to be placed in interference fit with surface 66 of an endmost driveshaft section 13. In other words, hub portion 80 is equivalent to end portion 58 of each of the driveshaft sections and, when in full interference fit with surface 66, is connected in torque transmitting relationship with the driveshaft sections. The coupling 78 has a flange portion 82 in which bolt holes 84 are provided to facilitate its connection to a power take-off shaft, not shown.

The tie-bolt assembly 70 also includes, at the end opposite from coupling 78, a thrust bearing assembly 86. The assembly 86 comprises a washer-like stationary thrust bearing 88, secured by bolts 89 to end wall 16, a thrust collar 90 mounted on bar 72, a loading cone 92 and a thrust nut 94 threaded on threaded end 76 of bar 72. The loading cone 92 embraces the frusto-conical end portion 58 of the adjacent endmost driveshaft section 13 and fits within a sleeve bearing 93 disposed in end wall 16. The thrust bearing 88 has a central opening through which projects end portion 76 of bar 72 and the hub portion 91 of thrust collar 90.

In the assembly of thrust bearing assembly 86 thrust collar 90 is slipped over the end portion of bar 72 so as to abut loading cone 92 before stationary thrust bearing 88 is positioned and secured to end wall 16. Thereafter, thrust nut 94 is turned upon threaded end portion 76 of bar 72 and, via a washer 96, applies an axial force on thrust collar 90 in a direction toward the left as viewed in FIG. 1. This axial force is transmitted via loading cone 92 to the driveshaft sections 13. Simultaneously, this nut applies an axial force in the opposite direction on bar 66 which is transmitted by way of coupling 78 to the driveshaft sections 13 so that, in effect, the driveshaft sections are clamped together by tie-bolt assembly 70. An oil seal 98 is provided between stationary thrust bearing 88 and thrust collar 90. To provide a desired amount of float or clearance of the driveshaft relative to the housing, the axial length of loading cone 92 is selected such that, when thrust nut 94 is tightened to bring thrust collar 90 into strong abutment with loading cone 92, clearances 100 are provided between thrust collar 90 and end wall 16 and thrust bearing 88.

DRIVESHAFT ASSEMBLY

Figure 4:
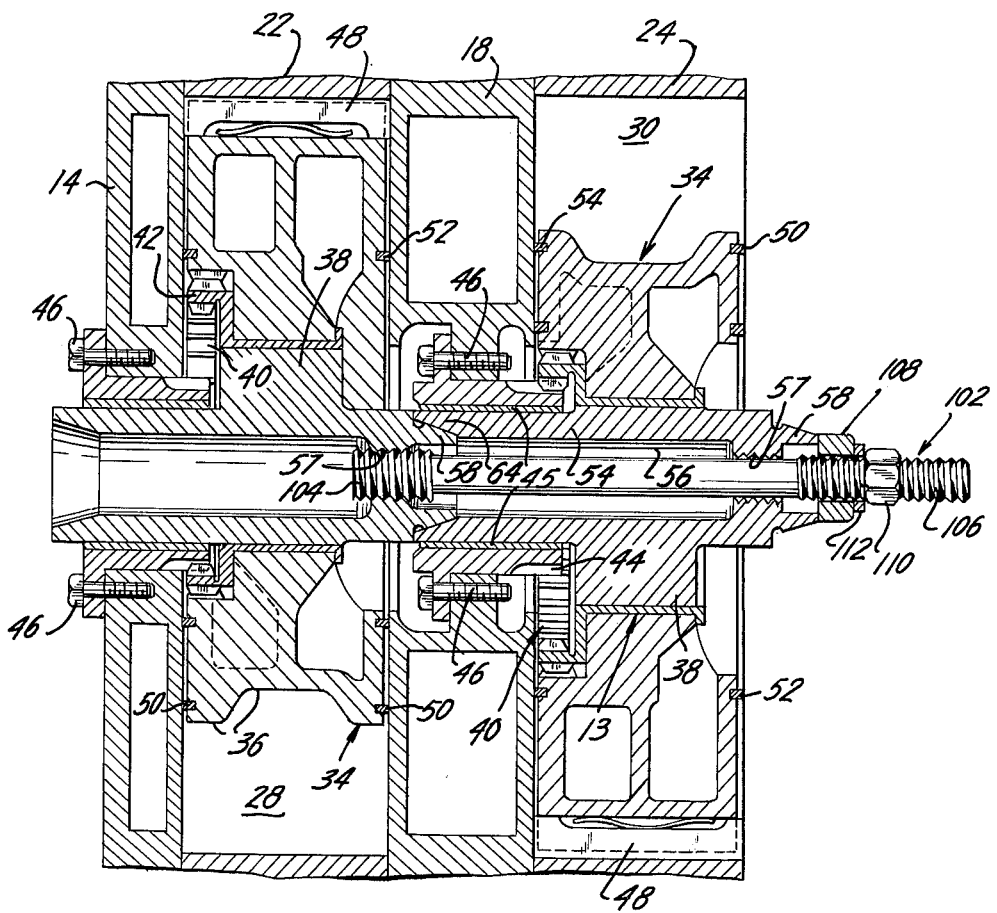
FIG. 4 is a view in cross-section showing the multi-sectional driveshaft of FIG. 1 in the course of assembly and the tool means, according to a first embodiment, for such purpose.

In the assembly of the multi-unit rotary piston mechanism 10 and, more particularly, the assembly of driveshaft 12, each subsequent driveshaft section 13 may be secured to the next adjacent driveshaft section 13 with the assistance of a tool 102 shown in FIG. 4. Since FIG. 4 is a view similar to part of the mechanism 10 shown in FIGS. 1 to 3, the parts of the structure shown in FIG. 4 corresponding to the parts shown in FIGS. 1 to 3 will be designated by the same reference numbers.

The tool 102 comprises an elongated rod having threaded opposite end portions 104 and 106, a thrust collar 108, a thrust nut 110 and washer 112. The threaded end portion 104 is dimensioned to mesh with the internally threaded portion 57 of each of driveshaft sections 13. The rod is of a length greater than the length of a driveshaft section so that, when threaded end portion 104 is in mesh with threaded portion 57 of one driveshaft section, its opposite threaded end portion 106 projects beyond end portion 58 of a next adjacent driveshaft section 13.

In employing tool 102 to effect assembly of multi-sectional driveshaft 12, according to this invention, and more particularly, effect an interference fit between end portions 58 and 64 of next adjacent driveshaft sections 13, the threaded end portion 104 of tool 102 is turned into threaded portion 57 of a first driveshaft 13, either before or after an intermediate wall 20 and its associated timing pinion gear 44 and bearing sleeve 45 is positioned in place. The next adjacent driveshaft section 13 to be connected to the first driveshaft section is then inserted in bearing sleeve 45 so that its end portion 64 engages end portion 58 of the said first driveshaft section 13. The thrust collar 108 is then slipped over end portion 106 of the tool and positioned against end portion 58 of the driveshaft section being attached. The washer 112 is placed against thrust collar 108 and thrust nut 110 is then turned on threaded end portion 106 of the tool and tightened with a suitable wrench or other tool. As thrust nut 110 is tightened it applies an axial force on the driveshaft sections. This axial force drives end portion 64 and its surface 66 of the driveshaft section being connected on to end portion 58 and surface 60 of the first driveshaft section. As previously stated, the telescoping end portions 58 and 64 are forced into a desired torque transmitting interference fit and in so doing undergo some deformation. The tightening of the thrust nut continues until end portion 64 abuts shoulder 62 and thereby positively positions the driveshaft section and its eccentric 38 axially relative to peripheral wall 24 and rotary piston 34 which are thereafter added to the assembly. After the two driveshaft sections are brought into proper engagement, as evidenced by the abutment of end portion 64 and shoulder 62, the thrust nut 110, washer 112, and thrust collar 108 are removed from threaded end portion 106 of the rod. The tool is then turned to disengage its threaded portion 104 from threaded portion 57. The rod is next axially indexed and turned to engage threaded portion 57 of the driveshaft section just assembled. This connects the tool 102 for assembly of the next or third driveshaft section, not shown, after intermediate wall 20 (not shown in FIG. 4) and its associated pinion gear 44 and sleeve bearing 45 are properly positioned relative to peripheral wall 24. This third driveshaft section is then connected to the one just assembled in the same manner as previously described. The previously described procedure is followed until all of the driveshaft sections 13, forming the complete multi-sectional driveshaft 12, are secured together. The tool 102 is then removed and the tie-bolt assembly 70 assembled as previously described herein.

DRIVESHAFT DISASSEMBLY

Figure 5:
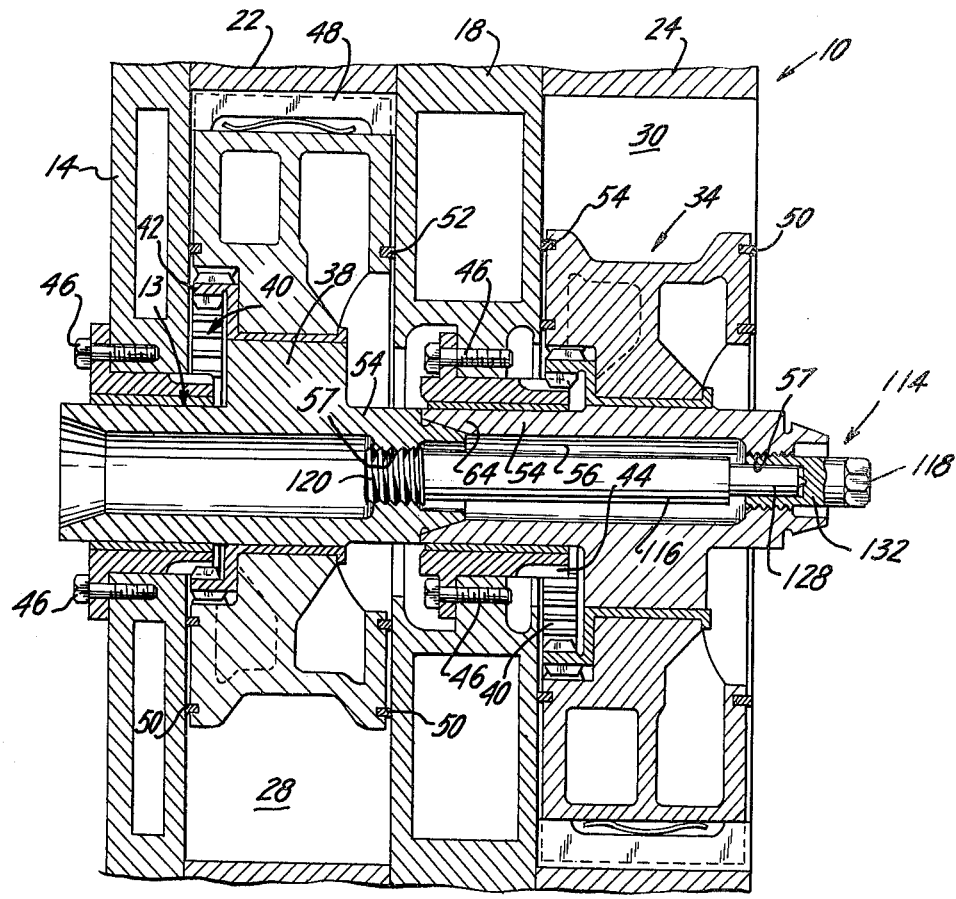
FIG. 5 is a cross-sectional view showing the multi-sectional driveshaft of FIG. 1 in the course of disassembly and the means, according to a second embodiment, for such purpose.

In FIG. 5 is shown a tool 114, according to a second embodiment, which may be employed to effect the disassembly of multi-sectional driveshaft 12 of this invention and, more specifically, the disconnection of one driveshaft section 13 from the next adjacent driveshaft section. As in the use of tool 102 for assembly, the tool 114 coacts with the internally threaded portions 57 of each driveshaft section 13. FIG. 5 is a view similar to FIG. 4 and therefore parts of the structure shown in FIG. 5 corresponding to parts shown in FIG. 4 will be designated by the same reference numbers.

Figure 6:
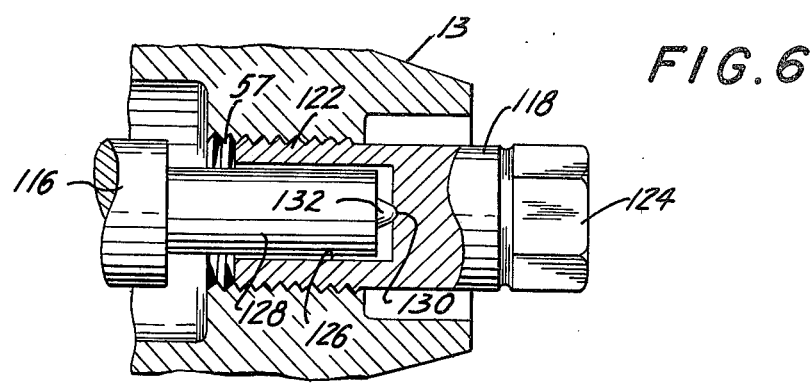
FIG. 6 is an enlarged fragmentary view in cross-section of part of the means shown in FIG. 5.

As illustrated in FIG. 5, tool 114 comprises a thrust bar 116 and thrust stud 118. The thrust bar 116 has a slightly enlarged diameter end portion 120 which is provided with threads adapted to mesh with internally threaded portion 57 of a first driveshaft section 13. The thrust stud 118, as best shown in FIG. 6, has a threaded shank portion 122 and a hexagonally formed opposite end portion 124. An axially extending recess 126 is formed in shank portion 122 and is dimensioned to loosely receive therein a reduced diameter end portion 128 of bar 116. The bottom of recess 126 is provided with an axially located dimple 130 which receives a centering teat 132 co-axially extending from end portion 128.

In the use of tool 114, thrust bar 116 is turned so that end portion 120 engages internally threaded portion 57 of the driveshaft section to be disengaged from a first driveshaft section. The thrust bar is turned until end portion 120 thereof completely disengages from threaded portion 57. It is then axially moved in aligned axial bores 56 until its threaded end portion 120 contacts threaded portion 57 of the first driveshaft section. Thereafter, it is turned to engage that threaded portion as is shown in FIG. 5. The stud 118 is then turned into threaded portion 57 of the driveshaft section to be disengaged until teat 132 of bar 116 engages dimple 130 in the bottom of recess 126. By applying a torque force on end portion 124 of stud 118 by a suitable tool such as a wrench, an axially directed force is applied to bar 116 in a direction toward the left as viewed in FIGS. 5 and 6. Simultaneously, an equal and opposite force directed to the right as viewed in FIGS. 5 and 6, is applied by stud 118 to the driveshaft section to be removed. These oppositely directed forces applied to the two driveshaft sections breaks the connection of the telescopically engaged end portions 58 and 64. This procedure is followed for total disassembly of driveshaft 12 until the last two driveshaft sections, such as shown in FIG. 5, are separated.

In FIG. 7 is shown an alternative tool means 134 which may be employed for effecting separation of driveshaft sections 13 of multi-sectioned driveshaft 12. FIG. 7 is a view similar to FIGS. 4 and 5 and therefore corresponding parts in the respective figures will be identified by the same numbers.

The tool means 134 comprises a threaded plug 136, a coupling 138, a source of pressurized fluid such as a pump 140 and an instrument 142 for insertion and removal of plug 136. More specifically, threaded plug 136 is provided with a polygonal shaped recess in at least one end thereof which is adapted to receive an Allen type wrench 142 to facilitate the insertion and removal of the plug from threaded portion 57 of each of the driveshaft sections 13. The coupling 138, as best shown in FIG. 8, has a threaded end portion 144 and an axial bore 146 therethrough. The threaded end portion 144 is constructed and arranged to mesh with internally threaded portion 57 of the driveshaft section 13 to be removed. A pipe 148 is suitably connected at one end to the outer end of coupling 138 and, at the opposite end, to pump 140 so as to conduct pressurized fluid, through bore 146 of the coupling, into bore 56 of the driveshaft section to be removed. With plug 136 and coupling 138 in place, as shown in FIG. 7, a chamber is formed in bore 56. To insure that the chamber has the required sealing, coupling 138 may be provided with an annular seal 150 carried in a flanged portion 152 of the coupling. The seal 150 is compressed against the end of the driveshaft section when the coupling is turned sufficiently into meshing relationship with threaded portion 57.

As can be readily seen, pressurized fluid conducted into bore 56, via pipe 148, and bore 146 of coupling 138, exerts a pressure on the end portion 58 of one driveshaft section 13, and on the surface of the adjacent internally threaded portion 57 of the connected driveshaft section 13. Thus, forces in opposite directions are exerted against the connected driveshaft sections driving them out of engagement.

Where there are three or more driveshaft sections 13 to be separated, a plug 136 can be inserted from the opposite end of a driveshaft section from that illustrated in FIG. 7 by turning the plug in a first internally threaded portion 57 until it disengages, axially indexed and then inserted in the internally threaded portion 57 of the next adjacent driveshaft section 13. In the alternative, the same procedure as above described may be followed by insertion of plug 136 in the same end of the driveshaft section as illustrated in FIG. 7 but employing an Allen type wrench substantially longer in length than that shown.

Figure 9:
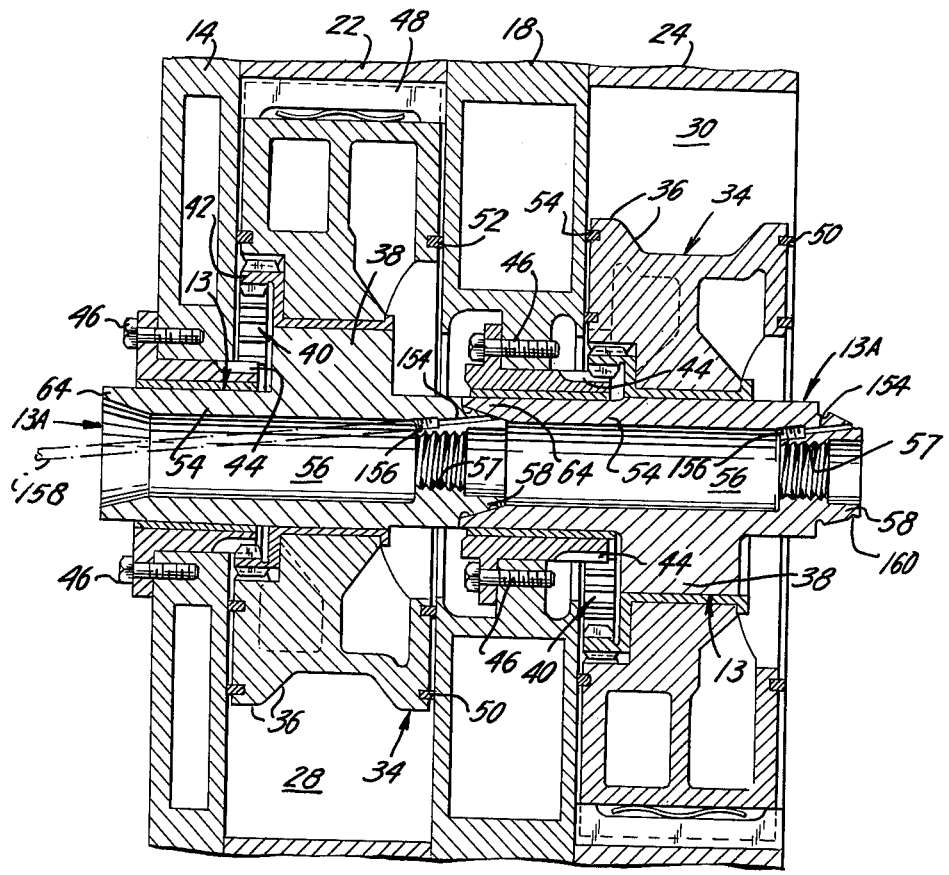
FIG. 9 is a view similar to FIGS. 5 and 7 showing the means, according to a fourth embodiment, for effecting disassembly of the driveshaft sections.
Figure 10:
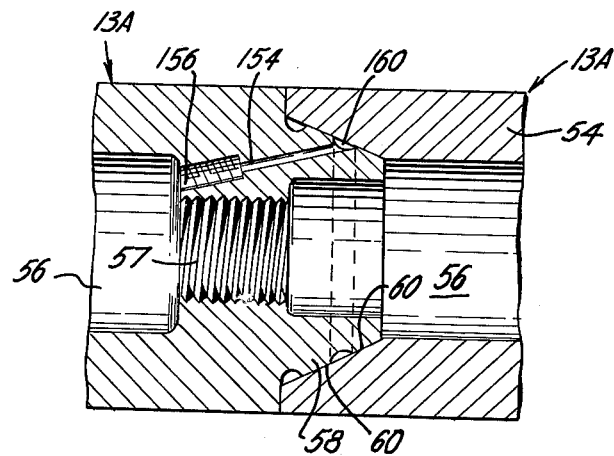
FIG. 10 is an enlarged, fragmentary view in cross-section of the means shown in FIG. 9.

In FIGS. 9 and 10 is shown an alternative driveshaft section 13A which differs from driveshaft section 13 of FIGS. 1 to 8 only in that it has a pressurized fluid passage 154 extending in end portion 58 from surface 60 to axial bore 56, the passage 154 having a threaded portion 156 for receiving a male connector (not shown) of a pressurized fluid supply pipe 158 (shown in broken lines in FIG. 9). In view of the structural similarities, the parts of the structure shown in FIGS. 9 and 10 will be designated by the same numbers that identify like parts shown in FIGS. 1 to 8.

The pressurized fluid passage 154 is utilized as a tool means in the disassembly or separation of connected driveshaft sections 13A, and functions to conduct pressurized fluid from pipe 158 to the interstices between surfaces 60 and 66 of the adjacent driveshaft sections. The pressurized fluid acts to separate the two engaged driveshaft sections. As best shown in FIG. 10, it is preferred that passage 54 terminate in an annular recess 160 formed in surface 60 to insure that pressure is applied circumferentially on surface 66.

It is now believed readily apparent that the present invention provides a multi-sectional driveshaft for a multi-unit rotary piston mechanism in which each driveshaft section is identical and completely interchangeable with each other thereby minimizing fabrication, assembly and repair costs. The invention also provides a multi-sectional driveshaft which is capable of having its constituent driveshaft sections brought into proper connection with each other and in the desired relationship with the other components of the mechanism quickly and easily. It is also multi-sectional driveshaft in which the driveshaft sections can be quickly and easily disconnected from each other.

Although several embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. In a rotary piston mechanism having a plurality of units each of which consists of a piston and a housing forming a cavity in which the piston is supported for planetary movement, a multi-sectional driveshaft comprising:
   (a) a plurality of driveshaft sections, one for each unit;
   (b) each driveshaft section comprising:
      (b-1) an elongated body having an axial bore therethrough and an eccentric portion between the opposite end portions thereof for supporting a piston;
      (b-2) one end portion having a tapered outer surface extending from the end of the one end portion and terminating in an annular shoulder extending in a plane substantially normal to the axial bore;
      (b-3) the other end portion having a portion of the inner surface of the axial bore adjacent thereto tapered and of a size complementary to said tapered outer surface of said one end portion;
   (c) said plurality of driveshaft sections being disposed in axial alignment with the eccentric portions of each driveshaft section in its associated housing cavity and the tapered outer surface of said one end portion of each driveshaft section being telescopically receivable in the complementary tapered inner surface portion of the bore of the next adjacent driveshaft section and with the end of the other end portion in abutment against the annular shoulder of the next adjacent one end portion; and
   (d) the complementary tapered inner and outer surfaces of the said one end portion and said other end portion of the driveshaft sections are dimensioned so that torque transmitting capacity is divided between the interference fit between the complementary tapered inner and outer surfaces of the telescoped end portions and the frictional contact of the annular shoulder and the end of said one end portion of the driveshaft sections.

2. The apparatus of claim 1 wherein each body of a driveshaft section is cylindrical in shape with the eccentric portion being an enlarged integral cylinder portion having an axis offset from the axis of the elongated body of the driveshaft section, wherein said one end portion is of reduced diameter and having a tapered surface terminating at said shoulder so that the shoulder is annular in shape, and wherein said other end portion is provided with an outwardly tapered bore portion complementary to the tapered surface of said one end portion.

3. The apparatus of claim 1 wherein said bore has an internally threaded portion adapted to receive tool means for assembly and disassembly of the driveshaft sections.

4. The apparatus of claim 3 wherein each driveshaft section is provided with fluid passageway means communicating the area externally surrounding said one end portion with the axial bore and including connecting means for receiving a supply pipe means for conducting fluid under pressure from a source thereof to said fluid passageway means so as to force adjacent engaged driveshaft sections out of telescopic engagement.

5. The apparatus of claim 4 wherein said internally threaded portion of the bore is located adjacent said one end portion and wherein said fluid passageway means is adjacent said internally threaded portion and has a longitudinal axis positioned so that an extension thereof passes out of the bore at said other end portion without intersecting the driveshaft section.

6. The apparatus of claim 5 wherein said supply pipe means has a threaded portion and wherein said connecting means is a threaded bore for receiving the threaded portion of the supply pipe means.

* * * * *